April 22, 1958     A. A. BRISKIER     2,831,479
PULSE-RATE-MEASURING DEVICE
Filed March 1, 1956
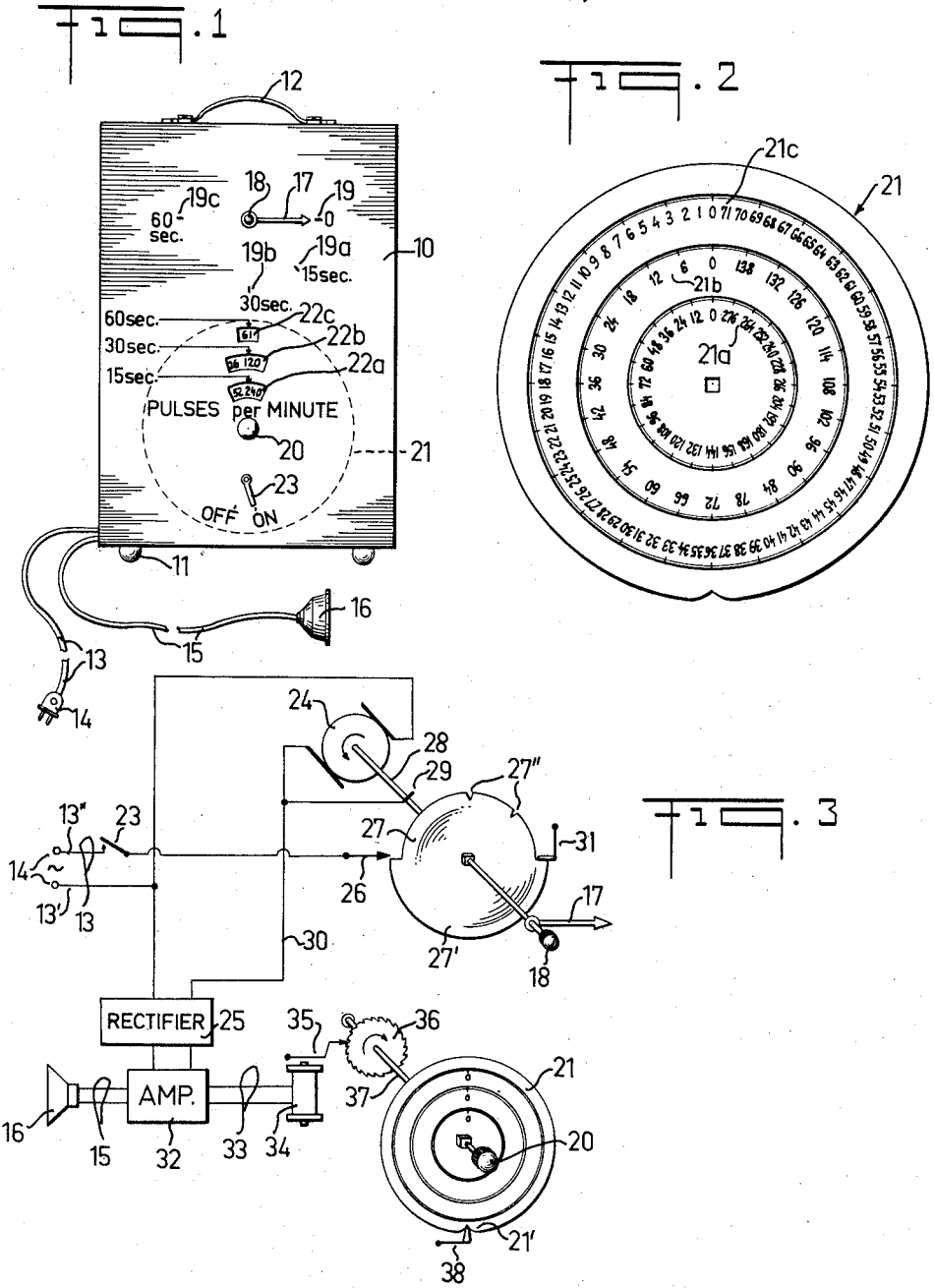

United States Patent Office 2,831,479
Patented Apr. 22, 1958

2,831,479

PULSE-RATE-MEASURING DEVICE

Arthur A. Briskier, New York, N. Y.

Application March 1, 1956, Serial No. 568,895

7 Claims. (Cl. 128—2.05)

My present invention relates to a device for measuring the cadence, or rate of occurrence, of a train of pulses having substantially uniform (regular or irregular rhythm) spacing from one another. Examples of such pulses are the heartbeat of a person, the throb of an engine, or the impacts of a projecting part of a rotating wheel upon a stationary revolution-counting device.

It is an object of the present invention to provide a simple, inexpensive yet accurate device for determining the cadence of any train of pulses whose rate of occurrence, while variable, remains reasonably constant throughout a time interval corresponding to a sequence of, say, from several tens to several hundreds of pulses.

It is another object of this invention to provide a device of this character adjustable to measure the pulse rate at either relatively short intervals, for speed, or relatively long intervals, for accuracy.

It is a more specific object of my invention to provide a device as outlined above which can be used with the greatest convenience by a physician or a nurse for taking the pulse of a patient, without requiring the operator to divide his attention between the patient's arteries and the hands of a watch; which could be utilized to measure the pulse or the heartbeat of a person without the latter's co-operation, as when the subject is asleep; and which might even be applied by a medically untrained person, as for instance by the patient himself.

A feature of my present invention resides in the provision of a timer, presettable to measure a predetermined time interval, and a pulse counter so controlled from the timer as to be operative only during the running period of the latter. The pulse counter may be in the form of a stepping switch controlling the position of an indicator and responding to pulses applied to it from a suitable input circuit, if necessary through the intermediary of electric amplifying equipment. The indicator will preferably comprise a plurality of scales on which the cadence of the pulses may be read directly, e. g. in terms of pulses per minute, for different settings of the timer enabling the actual count to be performed over time intervals of various durations.

The invention will be described in greater detail with reference to the accompanying drawing in which:

Fig. 1 shows a front-elevational view of a medicinal pulse-measuring device embodying the invention;

Fig. 2 is a front view, on a larger scale, of a scale member forming part of the device of Fig. 1; and Fig. 3 is a circuit diagram of the device shown in Fig. 1.

The device illustrated in the drawing represents a portable instrument for measuring the pulse of a patient. It comprises a housing 10 supported on legs 11 and provided with a handle 12 for carrying. Other outward appendages are a cable 13 with plug 14 connectable to any convenient source of alternating current, such as the ordinary house mains, and another cable 15 terminating in a microphone 16 adapted to be placed upon the chest of a patient.

Positioned on the forward face of the housing 10 are a pointer 17 controllable by a knob 18, this pointer co-operating with markings 19, 19a, 19b, 19c respectively bearing the legends "0," "15 sec.," "30 sec." and "60 sec."; a second knob 20 controls an indicator disk 21 whose markings, shown in full in Fig. 2, are partly visible through three windows 22a, 22b, 22c. It will be noted that legends reading "15 sec.," "30 sec." and "60 sec." are also associated with the windows 22a, 22b, 22c, respectively. There is further provided an "on-off" switch 23.

From Fig. 2 it will be noted that disk 21 bears three scales 21a, 21b, 21c consisting of numerical markings which can be viewed through the windows 22a, 22b, 22c, respectively. The outermost scale 21c bears the numbers 0 through 71; intermediate scale 21b bears numbers whose values are double those of adjacent numbers of scale 21c with which they are in angular alignment; and innermost scale 21a bears numbers which are again twice as large as the adjacent numbers of scale 21b. For convenience of illustration, only every third number on scales 21a and 21b has been shown; windows 22a and 22b have, for this reason, been shown somewhat enlarged so that a whole number is visible therethrough in every position of disk 21.

Reference is now made to the circuit diagram of Fig. 3 for a description of the internal construction of my device. Cable 13 is here shown as a two-wire line including a wire 13' and a wire 13". Wire 13' leads to one input terminal of a single-phase motor 24 and also to one input terminal of a rectifier network 25; wire 13" leads to a wiper 26 positioned for engagement with a disk 27 having a semicircular contact arc 27'. Shaft 28 of motor 24 carries the disk 27 as well as pointer 17 and knob 18; this shaft is engaged by a brush 29 connected to a conductor 30 which also leads to the other input terminals of motor 24 and rectifier network 25. A resiliently mounted dog 31 is adapted to co-operate with the shoulders of arc 27' and with notches 27" in disk 27 so as to index the latter in a home position and in three operating positions spaced 45°, 90° and 180° from said home position, these angular spacings corresponding to those of markings 19 from one another.

Rectifier network 25 serves as a power supply for an amplifier 32 whose input is connected to the electro-acoustic transducer 16 by way of cable 15, the latter having also been shown as a two-wire line. A similar two-wire line 33 leads from the output of amplifier 32 to a stepping magnet 34 whose armature 35 engages a ratchet 36, the latter being mounted on a common shaft 37 with disk 21 and knob 20. A resiliently mounted dog 38 is adapted to engage a notch 21' in disk 21 for the purpose of indexing the latter in a starting position in which the markings "0" of scales 21a, 21b, 21c are visible through the windows 22a, 22b, 22c.

If, as assumed, the device is to be used to measure the pulse rate of a patient by counting his heartbeats, the amplifier 32 may include suitable filter networks to insure that the magnet 34 responds to each beat only once; the number of teeth on ratchet wheel 36 will be so selected that disk 21 advances by one division of scale 21c for each pulse, this number being thus equal to the number of such divisions (72 in the present example) if no speed-changing transmission is inserted between the ratchet wheel and the disk.

The operation of my device will now be described.

The motor 24 is so timed that shaft 28 will perform half a revolution in exactly one minute. Let us assume that the operating physician desires to measure the rate of a relatively sluggish pulse over a one-minute interval. With switch 23 in its "off" position, which opens the wire 13", and with disk 21 initially set to zero, he rotates knob 18 until pointer 17 is on the "60 sec." marking 19c, applies the microphone 16 to the chest or some artery of the patient, and turns switch 23 to "on." He then simply sits back and waits until pointer 17 has returned to zero while the device automatically takes the count. Thus, closure of switch 23 in any position of pointer 17 other than its zero position closes a circuit for motor 24 from source 14 over wire 13', motor 24, wire 30, brush 29, shaft 28, disk 27, contact arc 27', wiper 26, switch 23 and wire 13" back to source 14. Rectifier 25 is energized in parallel with motor 24 and supplies operating current to amplifier 32 which transmits to stepping magnet 34 the pulses picked up by microphone 16. Magnet 34 now advances the disk 21 by one unit step (here 5°) in response to each pulse until the circuits of motor 24 and rectifier 25 are simultaneously broken when the wiper 26 steps off arc 27' after a running time of one minute. The pulse rate of the patient, in terms of pulses per minute, may now be directly read in window 22c which is marked "60 sec."; the assumed reading, as shown in Fig. 1, will be "61."

With an appreciably faster pulse rate the physician might have found it convenient to use scale 21b for measuring same; to do this, he would have rotated pointer 17 on the mark 19b, again making sure that the disk 21 is in its zero position before closing switch 23. Since the contact disk 27 under these circumstances would have been displaced from its home position by 90° only, the timer motor 24 would have completed its run after half a minute and the number of pulses per minute would have to be computed as double the number of steps taken by indicator disk 21. This is easily done by taking the reading at "30 sec." window 22b, owing to the manner in which scale 21b has been calibrated; thus, if we assume that the apparatus has again come to rest in the position shown in Fig. 1, this would represent twice the previous pulse rate as indicated by the reading of "slightly more than 120" appearing in window 22b.

In analogous manner it will be possible to take a fast reading in 15 seconds' time by initially displacing the pointer 17 to the corresponding marking 19a. After a quarter of a minute, when the motor 24 has stopped, the reading appearing in window 22a will be "slightly more than 240," or four times the pulse rate assumed originally. It will thus be seen that, with the specific arrangement shown, pulse rates up to well above 250 pulses per minute can be conveniently measured.

My invention is, of course, not limited to the specific arrangement described and illustrated. Thus, it will be understood that batteries or other current sources may be used instead of the A.-C. supply shown, that motor 24 is representative of any conventional timer powered by mechanical, electrical or other means and that a variety of indicators may be substituted for the windows 22a–22c and disk 21.

I claim:

1. A device for measuring the cadence of a train of periodically occurring pulses, comprising, in combination, pulse-counting means, input means for applying said train of pulses to said pulse-counting means, timer means presettable to a plurality of different time intervals and including means for activating said pulse-counting means during any one of said different time intervals, and indicator means coupled with said pulse-counting means and comprising a plurality of indicating elements with numerical indications thereon related to one another in the same ratio as said time intervals.

2. A device according to claim 1, wherein said time intervals include different fractions of one minute.

3. A counter for determining the pulse rate of a patient, comprising, in combination, a pick-up microphone adapted to be placed in contact with the patient, amplifier means connected to said microphone, a source of power for said amplifier means, pulse-responsive stepping means connected to be energized by the output of said amplifier means, an energizing circuit connecting said source of power to said amplifier means, contact means operable between positions to open and to close said energizing circuit, timer means having a normal position and coupled with said contact means for opening said energizing circuit in said normal position but closing said circuit in other positions, said timer means being selectively presettable to a plurality of different starting positions each corresponding to a different return time interval, indicator means being provided with a plurality of scales whose numerical values are related to one another in the same ratio as said return intervals, said stepping means being so coupled with said indicator means as to advance said indicator means by one division of one of said scales in response to any one stepping impulse from said amplifier means, and manually operable means for placing said timer means in an off-normal starting position, said timer means being adapted to return to said normal position from such an off-normal position after a pre-determined return time interval.

4. A device for measuring the cadence of a train of periodically occurring pulses, comprising, a combination, pulse-counting means, input means for applying said train of pulses to said pulse-counting means, timer means presettable to a plurality of different time intervals and including means for activating said pulse-counting means during any one of said different time intervals, and rotary indicator means coupled with said pulse-counting means and comprising a plurality of rotary indicating elements with numerical indications thereon related to one another in the same ratio as said time intervals, said indicator means including stationary index means for reading said numerical indications.

5. A device for measuring the cadence of a train of periodically occurring pulses, comprising, in combination, pulse-counting means, input means for applying said train of pulses to said pulse-counting means, timer means presettable to a plurality of different time intervals and including means for activating said pulse-counting means during any one of said different time intervals, and rotary indicator means coupled with said pulse-counting means and comprising a plurality of numerical indications arranged on a rotary dial and related to one another in the same ratio as said time intervals, said indicator means including stationary index means for reading said numerical indications.

6. A counter for determining the pulse rate of a patient, comprising, in combination, a pick-up microphone adapted to be placed in contact with the patient, amplifier means connected to said microphone, a source of power for said amplifier means, pulse-responsive stepping means connected to be energized by the output of said amplifier means, an energizing circuit connecting said source of power to said amplifier means, contact means operable between positions to open and to close said energizing circuit and including means for indicating either of said positions, timer means having a normal position and coupled with said contact means for opening said energizing circuit in said normal position but closing said circuit in other positions, said timer means being selectively presettable to a plurality of different starting positions each corresponding to a different return time interval, indicator means being provided with a plurality of scales whose numerical values are related to one another in the same ratio as said return intervals, said stepping means being so coupled with said indicator means as to advance said indicator means by one division of one of said scales in response to any one stepping impulse from said amplifier means, and manually operable means for placing said timer means in an off-normal starting position and including means for indicating the starting position to which said timer means are set, said timer means being adapted to return to said normal position from such an off-normal position after a pre-determined return time interval.

7. A counter for determining the pulse rate of a patient, comprising, in combination, a pick-up microphone adapted to be placed in contact with the patient, amplifier means connected to said microphone, a source of power for said amplifier means, pulse-responsive stepping means connected to be energized by the output of said amplifier means, an energizing circuit connecting said source of power to said amplifier means, contact means operable between positions to open and to close said energizing circuit, timer means having a normal position and coupled with said contact means for opening said energizing circuit in said normal position but closing said circuit in other positions, said timer means being selectively presettable to a plurality of different starting positions each corresponding to a different return time interval, rotary indicator means being provided with a plurality of scales whose numerical values are related to one another in the same ratio as said return intervals and including a plurality of stationary index means respectively associated with said scales for reading the latter, said stepping means being so coupled with said indicator means as to advance said indicator means by one division of one of said scales in response to any one stepping impulse from said amplifier means, and manually operable means for placing said timer means in an off-normal starting position, said timer means being adapted to return to said normal position from such an off-normal position after a pre-determined return time interval.

References Cited in the file of this patent

UNITED STATES PATENTS

| | | |
|---|---|---|
| 2,346,098 | Williams | Apr. 4, 1944 |
| 2,352,874 | Williams | July 4, 1944 |
| 2,409,749 | Foulger | Oct. 22, 1946 |